United States Patent [19]

Tamai et al.

[11] Patent Number: 5,618,637
[45] Date of Patent: Apr. 8, 1997

[54] MAGNETIC RECORDING MEDIUM

[75] Inventors: Kiminori Tamai; Takashi Handa, both of Nagano, Japan

[73] Assignee: TDK Corporation, Tokyo, Japan

[21] Appl. No.: 408,106

[22] Filed: Mar. 21, 1995

Related U.S. Application Data

[63] Continuation of Ser. No. 981,312, Nov. 25, 1992, abandoned.

[30] Foreign Application Priority Data

Nov. 25, 1991 [JP] Japan .................................. 3-335646
Dec. 28, 1991 [JP] Japan .................................. 3-360326

[51] Int. Cl.$^6$ ........................................................ G11B 5/66
[52] U.S. Cl. .................... 428/694 B; 428/328; 428/329; 428/694 BC; 428/694 BP; 428/694 BG; 428/695; 428/900
[58] Field of Search .................................. 428/328, 329, 428/695, 694 B, 694 BC, 694 BP, 694 BG, 900

[56] References Cited

U.S. PATENT DOCUMENTS

| | | | |
|---|---|---|---|
| 4,075,384 | 2/1978 | Suzuki et al. | 428/212 |
| 4,506,000 | 3/1985 | Kubota et al. | 430/39 |
| 4,784,042 | 12/1988 | Kubota et al. | 428/328 |
| 5,225,281 | 7/1993 | Tamai et al. | 428/403 |

FOREIGN PATENT DOCUMENTS

| | | |
|---|---|---|
| 58-171765 | 10/1983 | Japan . |
| 60-71509 | 4/1985 | Japan . |
| 60-124023 | 7/1985 | Japan . |
| 60-184576 | 9/1985 | Japan . |
| 60-211625 | 10/1985 | Japan . |
| 60-212821 | 10/1985 | Japan . |
| 61-269225 | 11/1986 | Japan . |
| 62-85403 | 4/1987 | Japan . |
| 62-86531 | 4/1987 | Japan . |
| 3-272057 | 12/1991 | Japan . |

*Primary Examiner*—Leszek Kiliman
*Attorney, Agent, or Firm*—Oblon, Spivak, McClelland, Maier & Neustadt, P.C.

[57] ABSTRACT

An object is to provide magnetic recording medium having a densely packed, highly oriented magnetic layer by enhancing the dispersibility of magnetic powder having a carbon or iron carbide base surface. Magnetic powder is pretreated by kneading and dispersing it with an organic solvent and optionally, an anionic or ampholytic surfactant and a fatty acid, and a resin containing an amino group or ammonium salt group is used as a binder.

19 Claims, No Drawings

MAGNETIC RECORDING MEDIUM

This application is a continuation of application Ser. No. 07/981,312, filed on Nov. 25, 1992, now abandoned.

BACKGROUND OF THE INVENTION

1. Field of the Invention

This invention relates to magnetic recording media of the coating type, for example, various forms of magnetic tape.

2. Background Art

Needle iron oxide is typical of magnetic powders which are used in magnetic recording media. Since needle iron oxide alone cannot accommodate the requirements for higher density magnetic recording, a variety of magnetic materials with high coercivity and enhanced saturation magnetization have been developed.

For example, iron carbide series magnetic powders in which at least the surface is iron carbide are proposed in Japanese Patent Application Kokai (JP-A) Nos. 71509/1985, 124023/1985, 184576/1985, 211625/1985, 212821/1985, 269225/1986, 85403/1987, 86537/1987 and 86531/1987. Also the inventors proposed magnetic powder having a carbon base surface in Japanese Patent Application No. 272057/1991. These magnetic powders are characterized by high coercivity, enhanced saturation magnetization, good conductivity and good light screen.

These prior art approaches, however, do not take into account the dispersion of magnetic powder in a binder and therefore, the magnetic layer is low in packing density and orientation. For example, some of the above-listed patent publications add fatty acids such as lauric acid and stearic acid to magnetic coating compositions as dispersants, but only that means is insufficient in terms of packing density and orientation.

DISCLOSURE OF THE INVENTION

A primary object of the present invention is to enhance the dispersion of a magnetic powder having a carbon or iron carbide base surface in a binder, for forming a tightly packed, fully oriented magnetic layer for improving magnetic properties and electromagnetic properties.

This and other objects are attained by the construction defined below as (1) to (11).

(1) A magnetic recording medium comprising a nonmagnetic substrate and a magnetic layer thereon containing a magnetic powder having a carbon and/or iron carbide base surface and a binder, said binder contains an amino group and/or ammonium salt group.

(2) The magnetic recording medium of (1) wherein said magnetic layer contains a fatty acid.

(3) The magnetic recording medium of (2) wherein said fatty acid is contained in an amount of 0.5 to 2% by weight based on the weight of said magnetic powder.

(4) The magnetic recording medium of (2) wherein said fatty acid has 10 to 20 carbon atoms.

(5) The magnetic recording medium of (4) wherein said fatty acid has 14 to 18 carbon atoms.

(6) The magnetic recording medium of (1) wherein said magnetic recording layer contains at least one of anionic surfactants and ampholytic surfactants.

(7) The magnetic recording medium of (6) wherein said surfactant is contained in an amount of 0.5 to 10% by weight based on the weight of said magnetic powder.

(8) The magnetic recording medium of (1) wherein the magnetic powder and an organic solvent are kneaded and dispersed, a magnetic coating composition containing the magnetic powder, the binder and the organic solvent is then prepared, and said magnetic layer is formed from a magnetic coating composition.

(9) The magnetic recording medium of (8) wherein the magnetic powder, a fatty acid and the organic solvent are kneaded and dispersed.

(10) The magnetic recording medium of (8) wherein the magnetic powder, the surfactant and the organic solvent are kneaded and dispersed.

(11) The magnetic recording medium of (1) wherein the magnetic powder has an iron base core and a carbon base surface.

DESCRIPTION OF THE PREFERRED EMBODIMENT

The illustrative construction of the present invention is described below.

The magnetic recording medium of the present invention includes a magnetic layer which contains a magnetic powder containing magnetic particles having a carbon and/or iron carbide base surface.

The magnetic powder having an iron carbide base surface may be prepared by mixing an iron cyanide with a sulfate, sulfite or sulfide, placing the mixture in an iron-made reactor, and heat reducing the mixture while introducing CO into the reactor, followed by cooling. It may also be prepared by reducing an iron oxide, for example, iron oxyhydroxides such as α-FeOOH (Goethite), β-FeOOH (Akaganite) and γ-FeOOH (Lepidocrocite), etc. or iron oxides such as $\alpha$-$Fe_2O_3$, $\gamma$-$Fe_2O_3$, $Fe_3O_4$, $\gamma$-$Fe_2O_3$-$Fe_3O_4$ (solid solution), etc., with carbon monoxide or a gas mixture of hydrogen and carbon monoxide as disclosed in JP-A 171765/1983 and 124023/1985.

Alternatively, iron carbide may be prepared by reducing a slurry mixture of any of these iron oxides in an aqueous colloidal carbon black particle suspension with hydrogen, carbon monoxide or a mixture of hydrogen and carbon monoxide. Examples of the iron cyanides which can be used herein include hexacyano iron salts such as Turnbull's blue, Berlin white, etc., and ferro- and ferricyanides such as potassium ferrocyanide, sodium ferrocyanide, potassium ferricyanide, sodium ferricyanide, etc. Examples of the additives which can be used herein include sulfates such as potassium sulfate, sodium sulfate, ammonium sulfate, iron sulfate, sodium hydrogen sulfate, and potassium hydrogen sulfate; sulfites such as potassium sulfite, sodium sulfite, ammonium sulfite, and potassium hydrogen sulfite; and sulfides such as sodium thiosulfate, potassium thiosulfate, sodium sulfide, potassium sulfide, iron sulfide, sodium rhodanide, potassium rhodanide, sodium isothiocyanate, and potassium isothiocyanate. The gas used in the heat reducing atmosphere is not limited to CO, and carbon-bearing reducing gases such as $CH_4$, water gas, and propane may also be used. Alternatively, pure iron particles are formed and subjected to any of the foregoing heat reducing treatments. For reduction purpose, a heating temperature of about 300° to 700° C. and a heating time of about 30 minutes to about 10 hours may be employed.

There is thus produced magnetic powder represented by the formula $Fe_nC$ wherein n is a number of at least 2, especially from 2 to 3. Although it is not necessary that n be an integer or the material have a stoichiometric composition, there are often formed $Fe_2C$, $Fe_5C_2$, and $Fe_3C$. Particles may have a graded concentration, and iron carbide need not necessarily be present throughout particles insofar as iron carbide is present at the surface.

The magnetic powder having a carbon base surface may be prepared by heat treating the aforementioned iron carbide powder in a non-oxidizing atmosphere, especially in a non-oxidizing or inert gas atmosphere such as nitrogen, at 300° to 400° C. for 12 to 48 hours. The thus obtained magnetic powder is a black powder having a carbon base surface and an iron base internal core. The iron is present essentially as α-iron in the particle core. This magnetic powder exhibits significantly high σs and good retention of magnetic properties with time as compared with conventional metallic magnetic powders obtained by reducing iron oxide.

The presence of carbon at the magnetic powder surface can be analyzed by secondary ion mass spectroscopy (SIMS) to detect a C—C bond. The presence of α-iron can be analyzed by X-ray diffractometry (XRD). Preferably, the magnetic powder contains up to 20%, especially about 5 to 15% by weight of carbon with the balance of essentially α-iron because this composition ensures very high σs. Carbon contents insure retention of magnetic properties with time whereas σs becomes low with too high carbon contents.

The above-mentioned magnetic powder having a carbon or iron carbide base surface is in needle or granular form and may be suitably selected in accordance with the intended application of the magnetic recording medium although particles having a major diameter or length of 0.1 to 1 μm and an aspect or length-to-breadth ratio of from 1 to 20 are generally used. Needle form particles destined for video and audio tapes preferably have a length of 0.1 to 0.5 μm and a needle ratio of from 4 to 15.

Also, especially the magnetic powder having a carbon base surface should preferably have a specific surface area of about 20 to 70 $m^2/g$ as measured by BET based on nitrogen adsorption. It has a coercivity Hc of 1,000 to 1,800 Oe, especially 1,200 to 1,600 Oe and a saturation magnetization σs of at least 140 emu/g, especially 150 to 170 emu/g. It will be understood that a mixture of carbon and iron carbide may be present at the surface of magnetic powder according to the present invention.

According to the present invention, a binder containing an amino group or an ammonium salt group is used. The binder used herein may be obtained by copolymerizing a monomer containing an amino group or an ammonium salt group or by reacting a resin with amine or the like for amino or ammonium modification. Preferably the binder resin contains about 300 to 1,000 ppm of N from the amino group or ammonium salt group in its molecule.

The resin containing an amino group or ammonium salt group as a functional group preferably has a number average molecular weight of about 10,000 to 200,000. Exemplary resin skeletons include vinyl chloride-vinyl acetate copolymers (which may contain carboxylic acids), vinyl chloride-vinyl alcohol-vinyl acetate copolymers (which may contain carboxylic acids), phenolic resins, epoxy resins, urethane resins, vinyl chloride-vinylidene chloride copolymers, urea resins, butyral resins, formal resins, melamine resins, alkyd resins, etc. An amino or ammonium group is introduced into these resin skeletons, often at their side chain.

The resin containing an amino group or ammonium salt group should occupy at least 50% by weight of the entire binder. The binder used herein may be an electron-beam curable, thermoplastic, thermosetting or reactive resin or a mixture thereof although the thermosetting and electron beam curable resins are preferred for film strength and other reasons. Where another resin free of an amino group or ammonium group is used, it may be selected from conventional well-known resins. The binder content of the magnetic coating composition is not particularly limited although the binder content is preferably 15 to 25 parts by weight per 100 parts by weight of magnetic powder.

Preferred examples of the thermosetting resins include mixtures of a crosslinking agent and a vinyl copolymeric resin such as vinyl chloride-vinyl acetate copolymers (which may contain carboxylic acid), vinyl chloride-vinyl alcohol-vinyl acetate copolymers (which may contain carboxylic acid), vinyl chloride-vinylidene chloride copolymers, chlorinated polyvinyl chloride, vinyl chloride-acrylonitrile copolymers, vinyl butyral copolymers, vinyl formal copolymers, etc.; mixtures of a crosslinking agent and a cellulosic resin such as nitrocellulose, cellulose acetobutyrate, etc.; mixtures of a crosslinking agent and a synthetic rubber such as butadieneacrylonitrile, etc.; resins of condensation polymerization type such as phenol resins, epoxy resins, polyurethane curable resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; and mixtures of any one of the foregoing condensation polymerization resins and a crosslinking agent such as isocyanates, wherein these resins contain an amino group or ammonium salt group.

The crosslinking agents which can be used to cure these binder resins include various polyisocyanates, preferably diisocyanates such as tolylene diisocyanate, hexamethylene diisocyanate and methylene diisocyanate. These crosslinking agents are reactive with amino or ammonium salt groups in the binder resins, thereby causing crosslinking of the binder resins. Usually 10 to 30 parts by weight of the crosslinking agent is used per 100 parts by weight of the resin. These thermosetting resins are generally cured by heating in an oven at 50° to 70° C. for 12 to 48 hours.

Among the preferred binders are electron beam-curable resins, that is, resins obtained by curing electron beam-curable compounds. Illustrative electron beam-curable resins are thermoplastic resins having contained or incorporated in their molecule groups capable of crosslinking or polymerizing upon exposure to electron beam, for example, acrylic double bonds as given by acrylic and methacrylic acids having an unsaturated double bond capable of radical polymerization and esters thereof, allyl double bonds as given by diallyl phthalate, and unsaturated bonds as given by amine-modified maleic acid and maleic derivatives. Other compounds having unsaturated double bonds capable of crosslinking or polymerizing upon exposure to electron beam may also be used.

The thermoplastic resins which can be modified into electron beam-curable resins include, for example, vinyl chloride copolymers, vinyl chloride-vinyl acetate-vinyl alcohol copolymers, vinyl chloride-acrylic copolymers, epoxy resins of saturated polyesters, urethane resins, phenoxy resins, and cellulosic resins. They may be acryl modified in a conventional manner. Thereafter, amino or ammonium salt groups are incorporated therein.

Preferably, these resins have a number average molecular weight of 20,000 to 50,000.

The magnetic powder used herein may contain in addition to iron carbide any of well-known magnetic powders which include oxide fine powders such as $\gamma\text{-Fe}_2\text{O}_3$, Co-containing $\gamma\text{-Fe}_2\text{O}_3$, $\text{Fe}_3\text{O}_4$, Co-containing $\gamma\text{-Fe}_3\text{O}_4$, $\text{CrO}_2$ barium ferrite and strontium ferrite, and metal fine powders such as Fe, Co, Ni or alloys thereof.

The solvent for the magnetic coating composition is not particularly limited, but is preferably selected from ketones such as cyclohexanone, methyl ethyl ketone and methyl isobutyl ketone, cellosolves such as ethyl cellosolve and cellosolve acetate, aromatics such as toluene, tetrahydrofuran, and dimethylformamide alone or mixtures thereof. The amount of the solvent used in the magnetic coating composition is not particularly limited although about 150 to 300 parts by weight of the solvent is preferably mixed with 100 parts by weight of the ferromagnetic powder.

Inorganic fine particles such as $\alpha\text{-Al}_2\text{O}_3$, $\text{Cr}_2\text{O}_3$, $\text{TiO}_2$, SiC and $\alpha\text{-Fe}_2\text{O}_3$ may be added to the magnetic coating composition for enhancing the mechanical strength of a magnetic layer formed therefrom. If desired, the magnetic coating composition may further contain various other additives including lubricants such as silicone oil.

The magnetic layer generally has a thickness of about 2 to 4 μm. If desired, an undercoat layer, a backcoat layer or the like may be applied to the substrate.

In the practice of the invention, the magnetic powder having a surface consisting predominantly of carbon or iron carbide surface is preferably pretreated for precluding aggregation of the powder and causing the powder to bear a surfactant thereon for providing improved dispersion with the binder as described later. More particularly, the magnetic powder and an organic solvent may be admitted into a ball mill, optionally together with an anionic or ampholytic surfactant and a fatty acid, and agitated therein for milling and dispersion, or they may be kneaded and dispersed in a kneader.

The organic solvent used herein is not particularly limited and may be any of solvents commonly used in magnetic coating compositions, for example, one or more of the above-mentioned solvents. Most effective are ketone and aromatic solvents, especially cyclohexanone, methyl ethyl ketone, methyl isobutyl ketone, and toluene. More than one of these ketone and aromatic solvents may be used. Alternatively, various organic solvents may be mixed into a mixture wherein ketone and aromatic solvents occupy 50% by weight or more.

Preferably the amount of organic solvent mixed with the magnetic powder in the pre-treatment step is 20 to 50parts by weight based on 100 parts by weight of the magnetic powder. Excess amounts could not fully eliminate aggregation whereas lesser amounts would cause fracture of particles.

In the pretreatment step, the kneading time is about 15 minutes to 12 hours. Then the organic solvent is borne on at least a portion of the magnetic powder surface. In this regard, the solvent not only covers the surface, but can also penetrate into the magnetic powder. The organic solvent can undergo air oxidation or be modified by magnetic particles whereupon the modified solvent covers the magnetic powder surface.

For kneading and dispersion, a surfactant may be additionally used. The surfactants used herein are not particularly limited insofar as they are anionic or ampholytic surfactants, and at least one of them may be used. The preferred anionic surfactants used herein are those having a hydrophilic group in the form of a carboxylate salt, sulfonate salt, sulfate ester, phosphate ester, taurinate salt or phosphonate salt. More useful among these are alkylsulfate salts of formulae (1), (2) and (3), polyoxyethylene alkyl ether sulfate salts of formulae (4) and (5), N-acylamic acids and salts of formulae (6)–(8), N-acylmethyltaurin acids of formula (9), polyoxyethylene alkyl ether sulfate salts of formula (10), alkylsulfocarboxylate salts of formula (11) and (12), α-olefinsulfonate salts of formula (13), alkylphosphate salts of formula (14), and polyoxyethylene alkyl ether phosphate salts of formulae (15( and (16(, all the formulae being shown below.

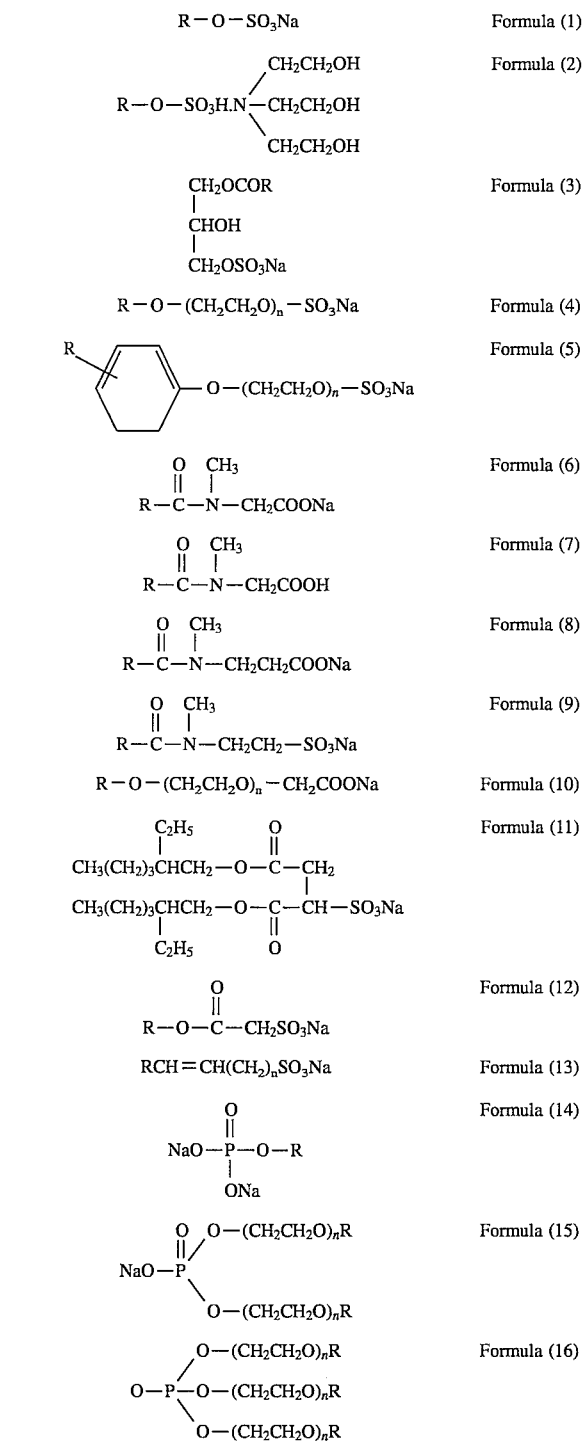

In formulae (1) to (16), R is an alkyl group having 6 to 40 carbon atoms. Illustrative examples of the anionic surfactant are given below.

sodium laurylsulfate
potassium laurylsulfate triethanolamine laurylsulfate
ammonium laurylsulfate
sodium myristylsulfate
sodium cetylsulfate
sodium stearylsulfate
sodium hardened coconut oil fatty acid glycerylsulfate
sodium POE (2) lauryl ether sulfate
sodium POE (3( lauryl ether sulfate
sodium POE (4) lauryl ether sulfate
triethanolamine POE (2) lauryl ether sulfate
triethanolamine POE (4) lauryl ether sulfate
ammonium POE (2) lauryl ether sulfate
sodium POE (3) alkyl ether sulfate
triethanolamine POE (3) alkyl ether sulfate
sodium POE (4) nonyl ether sulfate
triethanolamine POE (4) nonylphenyl ether sulfate
sodium cocoylsarcosine
lauroylsarcosine
sodium lauroylsarcosine
sodium myristoylsarcosine
sodium palmitoylsarcosine
oleoylsarcosine
sodium lauroylmethylalanine
sodium N-cocoylmethyltaurine
sodium N-lauroylmethyltaurine
sodium N-myristoylmethyltaurine
sodium N-palmitoylmethyltaurine
sodium N-stearoylmethyltaurine
sodium POE (3( alkyl ether acetate
sodium POE (6( alkyl ether acetate
sodium di-2-ethylhexylsulfosuccinate
sodium laurylsulfoacetate
sodium α-olefinsulfonate
sodium laurylphosphate
sodium POE (10) lauryl ether phosphate
sodium POE (4) lauryl ether phosphate
sodium POE (5) cetyl ether phosphate
sodium POE (8) oleyl ether phosphate
sodium oleylphosphate
di-POE (2) alkyl ether phosphoric acid
di-POE (4) alkyl ether phosphoric acid
di-POE (6) alkyl ether phosphoric acid
di-POE (8) alkyl ether phosphoric acid
di-POE (10) alkyl ether phosphoric acid
tri-POE (2) alkyl ether phosphoric acid
tri-POE (4) alkyl ether phosphoric acid
tri-POE (6) alkyl ether phosphoric acid
tri-POE (8) alkyl ether phosphoric acid
tri-POE (10) alkyl ether phosphoric acid
di-POE (4) nonyl phenyl ether phosphoric acid The ampholytic surfactants which can be used herein are preferably those having betaine, phosphocholine, amic acid, aminosulfate, sulfobetaine, etc. as a hydrophilic group. Preferred among these are acetic acid betaines or alkylaminobetaines of formulae (17) and (18), imidazolinium betaine of formula (19), and lecithin of formula (20).

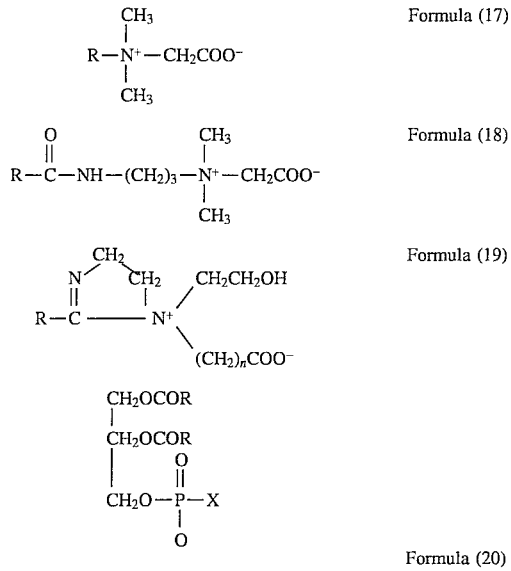

In these formulae, R is an alkyl group having 6 to 40 carbon atoms as defined above and X is a quaternary ammonium group-containing alkoxy group. Illustrative examples of the ampholytic surfactant are given below.

lauryldimethylaminoacetic acid betaine
coconut oil fatty acid amidopropyldimethylaminoacetic acid betaine
2-alkyl-N-carboxymethyl-N-hydroxyethylimidazolinium betaine
2-alkyl-N-sodium carboxymethyl-N-carboxymethyloxyethylimidazolinium betaine
refined soy beam lecithin
refined yolk lecithin The total amount of one or more surfactant mixed with the magnetic powder in the pretreatment step is preferably 0.5 to 10 parts, more preferably 1 to 5 parts by weight per 100 parts by weight of the magnetic powder. Larger or less amounts of the surfactant would be less effective for improving dispersion.

The fatty acids which can be used for kneading are preferably saturated fatty acids having 10 to 20 carbon atoms, more preferably 14 to 18 carbon atoms. More specifically, myristic acid, palmitic acid, stearic acid, etc. may be used. As the case may be, unsaturated fatty acids having 10 to 20 carbon atoms can be used. The fatty acid may be added to the magnetic powder together with the binder although it becomes more effective when it is kneaded and dispersed in the magnetic powder together with the organic solvent. The amount of fatty acid mixed with the magnetic powder is 0.2 to 1 part by weight per 100 parts by weight of the magnetic powder. Larger or less amounts of the fatty acid would be less effective for improving dispersion. By kneading and dispersing in this way, there can be obtained a magnetic layer having a high packing density and a high degree of orientation. While the fatty acid is added to the magnetic powder during kneading and dispersion, it may also be added to the coating composition such that the total amount of fatty acid is 0.5 to 2% by weight.

Now that the organic solvent and optionally, the surfactant and fatty acid are borne on at least the surface of the magnetic powder in this way, the use of the binder eliminates aggregation of the magnetic powder and forms a magnetic layer having a high packing density and a high degree of orientation.

EXAMPLE

Examples of the present invention are given below by way of illustration and not by way of limitation.

TABLE 1

| Sample No. | Magnetic powder surface | Fatty acid | Binder | Gloss before calender | Hc (Oe) | Squareness ratio (Br/Bm) | OR | Br (G) |
|---|---|---|---|---|---|---|---|---|
| 1 (Inv.) | carbon | — | ammonium salt | 135 | 1225 | 0.735 | 1.31 | 3080 |
| 2 (Inv.) | carbon | Stearic acid (magnetic layer) | ammonium salt | 137 | 1220 | 0.750 | 1.52 | 3240 |
| 3 (Inv.) | carbon | — (solvent pretreatment) | ammonium salt | 142 | 1202 | 0.773 | 1.75 | 3350 |
| 4 (Inv.) | carbon | Stearic acid (pretreatment + magnetic layer) | ammonium salt | 145 | 1198 | 0.785 | 1.82 | 3450 |
| 5 (Inv.) | carbon | Myristic acid (pretreatment) + stearic acid (magnetic layer) | ammonium salt | 143 | 1204 | 0.780 | 1.70 | 3400 |
| 6 (Inv.) | carbon | Stearic acid (pretreatment + magnetic layer) | ammonium salt | 150 | 1195 | 0.792 | 1.88 | 3480 |
| 7 (Inv.) | carbon | Stearic acid (pretreatment + magnetic layer) | amino | 147 | 1196 | 0.788 | 1.85 | 3460 |
| 8 (Inv.) | iron carbide | — | ammonium salt | 136 | 873 | 0.730 | 1.30 | 2090 |
| 9 (Inv.) | iron carbide | Stearic acid (pretreatment + magnetic layer) | ammonium salt | 145 | 860 | 0.780 | 1.80 | 2250 |
| 10 (CE) | carbon | — | — | 128 | 1245 | 0.687 | 1.07 | 2600 |
| 11 (CE) | iron carbide | — | — | 128 | 860 | 0.690 | 1.08 | 1590 |

Example 1

An iron carbide material consisting essentially of $Fe_5C_2$ was heat treated in $N_2$, obtaining a magnetic powder having a coercivity Hc of 1,320 Oe, a saturation magnetization σs of 152 em μ/g, a BET of 58 m$^2$/g, an average length of 0.20 μm and an average aspect ratio of 10. On SIMS analysis, the presence of C—C bond and predominance of carbon on the surface were ascertained. On X-ray diffractometry, the peak of $Fe_5C_2$ almost disappeared and the peak of α-Fe newly appeared. The carbon content was about 13%. Using this magnetic powder, a coating composition was prepared in accordance with the following formulation.

| | |
|---|---|
| Magnetic powder | 100 pbw |
| Vinyl chloride-vinyl acetate copolymer containing ammonium salt group degree of polymerization: about 300 average ammonium salt group per molecule: about 350 ppm of N | 14 pbw |
| Polyurethane resin number average molecular weight 40,000 | 6 pbw |
| α-$Al_2O_3$ | 3 pbw |
| MEK | 80 pbw |
| Toluene | 80 pbw |
| Cyclohexanone | 40 pbw |

The composition was thoroughly kneaded in a pressure kneader. Then 4 parts by weight of tolylene diisocyanate was added to the composition, which was dispersed in a sand grinder mill, coated on a PET film of 10 μm thick, and dried in an orienting magnetic field of 2,000 G applied. The coating was then calendered and heat cured at 60° C. for 24 hours. The magnetic layer had a final thickness of 3.0 μm. The film was cut to a strip of ½ inch wide by means of a slitter, obtaining a VHS video tape. For evaluating packing density, this sample No. 1 was measured for residual magnetization Br, coercivity Hc and squareness ratio Br/Bm by means of a VSM. For evaluating degree of orientation, the squareness ratio in the longitudinal direction was divided by the squareness ratio in the normal direction of the tape to give a degree of orientation OR. The coating before calendering was also measured for gloss. The results are shown in Table 1.

Example 2

Sample No. 2 was obtained by the same procedure as Example 1 except that 1 part by weight of stearic acid was added to the coating composition. The results are also shown in Table 1.

Example 3

The magnetic powder used in Example 1, 20 grams, was admitted into a vibratory steel ball mill having an interior volume of 140 ml and charged with 300 grams of 30-mm diameter steel balls. Then 5 grams of a 1/1 mixture of MEK/cyclohexanone was added as a solvent to the magnetic powder, which was milled and dispersed for one hour. Using the resulting magnetic powder, sample No. 3 was obtained as in Example 1. The results are also shown in Table 1.

Example 4

The magnetic powder used in Example 1, 20 grams, was admitted into a vibratory steel ball mill having an interior volume of 140 ml and charged with 300 grams of 30-mm diameter steel balls. Then 5 grams of a 1/1 mixture of MEK/cyclohexanone was added as a solvent to the magnetic powder, which was milled and dispersed for one hour. Using the resulting magnetic powder, sample No. 4 was obtained as in Example 2. The results are also shown in Table 1.

Example 5

Sample No. 5 was obtained by the same procedure as Example 4 except that the solvent for pretreatment was replaced by a 1/1 mixture of MEK/toluene, the fatty acid was replaced by myristic acid and its amount was 0.04 grams. The results are also shown in Table 1.

Example 6

In the pretreatment of Example 4, the ball mill was replaced by a compact kneader having an interior volume of 70 ml, 45 grams of the magnetic powder was kneaded with 20 grams of a 1/1 mixture of MEK/cyclohexanone having 0.45 grams of stearic acid dissolved therein by rotating the kneader at 200 rpm for one hour. By following the procedure of Example 3 except for these changes, sample No. 6 was obtained. The results are also shown in Table 1.

Example 7

Sample No. 7 was obtained by the same procedure as Example 4 except that the vinyl chloride-vinyl acetate copolymer containing an ammonium salt group was replaced by a vinyl chloride-vinyl acetate copolymer containing an amino group (degree of polymerization: 350, average amino group per molecule: about 800 ppm of N). The results are also shown in Table 1.

Example 8

There was furnished magnetic powder having Hc=950 Oe, $\sigma s$=96 emu/g, BET=48 m$^2$/g, an average length of 0.23 µm and an average aspect ratio of 7. On SIMS and X-ray analysis, the presence of iron carbide ($Fe_5C_2$) predominantly at the surface was ascertained. By following the procedure of Example 1 except for the use of this magnetic powder, sample No. 8 was obtained. The results are also shown in Table 1.

Example 9

Sample No. 9 was obtained by the same procedure as Example 4 except that the magnetic powder was replaced by that used in Example 8. The results are also shown in Table 1.

Comparative Example 1

Sample No. 10 was obtained by the same procedure as Example 1 except that the ammonium salt group-containing vinyl chloride-vinyl acetate copolymer was replaced by an ammonium salt group-free vinyl chloride-vinyl acetate copolymer. The results are also shown in Table 1.

Comparative Example 2

Sample No. 11 was obtained by the same procedure as Comparative Example 1 except that the magnetic powder was replaced by that used in Example 8. The results are also shown in Table 1.

The magnetic powder, 20 grams, was admitted into a vibratory steel ball mill having an interior volume of 140 ml and charged with 300 grams of 3-mm diameter steel balls. Then 7 grams of a 1/1 mixture of methyl ethyl ketone (MEK)/cyclohexanone having 0.6 grams of sodium polyoxyethylene POE (3) alkyl ether sulfate dissolved therein as an anionic surfactant was added to the magnetic powder, which was milled and dispersed for one hour at room temperature. Using this pretreated magnetic powder, the following composition was prepared.

| Composition | |
|---|---|
| Magnetic powder | 100 pbw |
| Vinyl chloride-vinyl acetate copolymer ammonium chloride degree of polymerization: about 300 average ammonium salt group per molecule: about 350 ppm of N | 14 pbw |
| Polyurethane resin number average molecular weight 40,000 | 6 pbw |
| $\alpha$-$Al_2O_3$ | 3 pbw |
| Methyl ethyl ketone | 80 pbw |
| Toluene | 80 pbw |
| Cyclohexanone | 40 pbw |

The composition was thoroughly kneaded in a pressure kneader. The composition was dispersed in a sand grinder mill, and 4 parts by weight of tolylene diisocyanate was added to the composition, which was coated on a PET film of 10 µm thick, and dried in an orienting magnetic field of 2,000 G applied. The coating was then calendered and heat cured at 60° C. for 24 hours. The magnetic layer had a final thickness of 3.0 µm. The film was cut to a strip of ½ inch wide by means of a slitter, obtaining a VHS video tape.

For evaluating packing density, this sample No. 21 was measured for residual magnetization Br, coercivity Hc and squareness ratio Br/Bm by means of a VSM. For evaluating degree of orientation, the squareness ratio in the longitudinal direction was divided by the squareness ratio in the normal direction of the tape to give a degree of orientation OR. The coating before calendering was also measured for gloss. The results are shown in Table 2.

TABLE 2

| Sample No. | Magnetic powder surface | Pretreatment Activator | Amount | Binder | Gloss before calender | Hc (Oe) | Br (G) | Squareness ratio (Br/Bm) | OR |
|---|---|---|---|---|---|---|---|---|---|
| 21 (Inv.) | carbon | anionic | 0.6/20 | ammonium salt | 160 | 1201 | 3480 | 0.813 | 2.03 |
| 22 (Inv.) | carbon | ampholytic | 0.2/20 | ammonium salt | 157 | 1203 | 3450 | 0.813 | 2.02 |
| 23 (Inv.) | carbon | anionic | 1.0/20 | amino | 161 | 1200 | 3480 | 0.815 | 2.05 |
| 24 (Inv.) | carbon | anionic | 1.35/20 | ammonium salt | 165 | 1195 | 3530 | 0.819 | 2.08 |
| 25 (CE) | iron carbide | anionic | 0.6/20 | ammonium salt | 161 | 895 | 2170 | 0.813 | 2.03 |

Example 10

An iron carbide material (consisting essentially of $Fe_5C_2$) was heat treated in $N_2$, obtaining a magnetic powder having a coercivity Hc of 1,320 Oe, a saturation magnetization $\sigma s$ of 152 emu/g, a BET of 58 m$^2$/g, an average length of 0.20 µm and an average aspect ratio of 10. On SIMS analysis, the presence of C—C bond and predominance of carbon on the surface were ascertained. On X-ray diffractometry, the peak of $Fe_5C_2$ almost disappeared and the peak of $\alpha$-Fe newly appeared. The carbon content was about 10% by weight.

Example 11

Sample No. 22 was obtained by the same procedure as Example 10 except that the anionic surfactant was replaced by an ampholytic surfactant, lauryldimethylaminoacetic acid betaine and its amount was 0.2 grams.

Example 12

Sample No. 23 was obtained by the same procedure as Example 10 except that the vinyl chloride-vinyl acetate copolymer was replaced by a similar copolymer containing 800 ppm calculated as N of an amino group and its amount was 1.0 gram. The results are also shown in Table 2.

Example 13

In the pretreatment of Example 10, the ball mill was replaced by a compact kneader having an interior volume of 70 ml, 45 grams of the magnetic powder was kneaded with 20 grams of a 1/1 mixture of MEK/cyclohexanone having 1.35 grams of coconut oil alkyl tri-methyl ammonium chloride dissolved therein by rotating the kneader at 200 rpm for one hour. The results of this sample No. 24 are also shown in Table 2.

Example 14

There was furnished magnetic powder having Hc=950 Oe, σs=96 emu/g BET=48 m$^2$/g, an average length of 0.22 μm and an average aspect ratio of 9 which was ascertained by SIMS and X-ray analysis of the presence of iron carbide (Fc$_5$C$_2$) predominantly at the surface. By following the procedure of Example 10 except for the use of this magnetic powder, sample No. 25 was obtained. The results are also shown in Table 2. The effectiveness of the present invention is evident from the data shown in Table 2.

The present invention provides significantly improved dispersion of magnetic powder in which the surface is at least carbon or iron carbide as well as improved packing density and degree of orientation thereof.

We claim:

1. A magnetic recording medium, comprising a non-magnetic and a magnetic layer thereon, said magnetic layer containing a magnetic powder having a carbon base surface, a fatty acid of about 10 to 20 carbon atoms and a binder resin, said binder resin having amino group- or ammonium salt group-containing side chains or both.

2. The magnetic recording medium of claim 1, wherein said fatty acid is contained in an amount of 0.5 to 2% by weight based on the weight of said magnetic powder.

3. The magnetic recording medium of claim 1, wherein said fatty acid has 14 to 18 carbon atoms.

4. The magnetic recording medium of claim 1, wherein said magnetic recording layer contains at least one of anionic and ampholytic surfactants.

5. The magnetic recording medium of claim 4, wherein said surfactant is contained in an amount of 0.5 to 10% by weight based on the weight of said magnetic powder.

6. The magnetic recording medium of claim 1, wherein the magnetic powder and an organic solvent are kneaded and dispersed, a magnetic coating composition containing the magnetic powder, the binder and the organic solvent is then prepared, and said magnetic layer is formed from the magnetic coating composition.

7. The magnetic recording medium of claim 6, wherein the magnetic powder, a fatty acid and the organic solvent are kneaded and dispersed.

8. The magnetic recording medium of claim 6, wherein the magnetic powder, the surfactant and the organic solvent are kneaded and dispersed.

9. The magnetic recording medium of claim 1 wherein the magnetic powder has an iron base core and a carbon base surface.

10. The magnetic recording medium of claim 1, wherein said magnetic powder is in needle or granular form having a length of 0.1 to μm and a length-to-breadth ratio of from 1 to 20.

11. The magnetic recording medium of claim 10, wherein said magnetic powder is in needle form with a length of 0.1 to 0.5 μm and a needle ratio of from 4 to 15.

12. The magnetic recording medium of claim 1, wherein said magnetic powder has a specific surface area of about 20 to 70 m$^2$/g as measured by BET based on nitrogen absorption, a coercivity Hc of 1,000 to 1,800 Oe, and a saturation magnetization σs of at least 140 emu/g.

13. The magnetic recording medium of claim 1, wherein said binder contains about 300 to 1,000 ppm of N from the amino group or ammonium salt group in its molecule.

14. The magnetic recording medium of claim 1, wherein said resin has a number average molecular weight of about 10,000 to 200,000.

15. The magnetic recording medium of claim 1, wherein said binder comprises from 15 to 25 parts by weight per 100 parts by weight of magnetic powder.

16. The magnetic recording medium of claim 1, wherein said resin is a thermosetting or electron beam curable resin.

17. The magnetic recording medium of claim 1, wherein said magnetic powder comprises a powder comprising γ-Fe$_2$O$_3$, Co-containing γ-Fe$_2$O$_3$, Co-containing γ-Fe$_3$O$_4$, Cro$_2$, barium ferrite, strontium ferrite, Fe, Co, Ni, alloys thereof or a mixture thereof.

18. The magnetic recording medium of claim 17, which further comprises γ-Al$_2$O$_3$, Cr$_2$O$_3$, SiC or γ-Fe$_2$O$_3$ or a mixture thereof.

19. The magnetic recording medium of claim 1, wherein said binder resin has attached thereto ammonium salt group-containing side chains.

\* \* \* \* \*

UNITED STATES PATENT AND TRADEMARK OFFICE
CERTIFICATE OF CORRECTION

PATENT NO. : 5,618,637
DATED : APRIL 8, 1997
INVENTOR(S) : TAMAI, ET AL.

It is certified that error appears in the above-identified patent and that said Letters Patent is hereby corrected as shown below:

Column 14, Claim 9, line 1 "claim 1 wherein"

should read --claim 1, wherein--.

Column 14, Claim 10, line 3, "to μm"

should read --to 1 μm--.

Column 14, Claim 18, line 2, "$Cr_2O_3$,"

should read --$Cr_2O_3$, $TiO_2$,--.

Signed and Sealed this

Sixteenth Day of June, 1998

Attest:

BRUCE LEHMAN

Attesting Officer

Commissioner of Patents and Trademarks